UNITED STATES PATENT OFFICE.

WALTHER RATHENAU, OF BERLIN, GERMANY.

PROCESS OF MAKING CARBID OF CALCIUM SIMULTANEOUSLY WITH SILICIDE OF IRON.

SPECIFICATION forming part of Letters Patent No. 676,514, dated June 18, 1901.

Application filed May 22, 1900. Serial No. 17,589. (No specimens.)

*To all whom it may concern:*

Be it known that I, WALTHER RATHENAU, a subject of the Emperor of Germany, residing at Berlin, N. W., Germany, have invented a new and Improved Process of Making Carbid of Calcium Simultaneously with Silicide of Iron, of which the following is a specification.

Pure carbid of calcium could not under processes heretofore known be made unless the raw material from which it is made is free of injurious admixtures, mainly of compounds of magnesium and silicon. Inasmuch as pure raw materials cannot always be conveniently obtained, it became necessary to produce a process by which substantially pure carbid of calcium could be made from lime containing silicon or coal containing silicon. Experiments which have been made in this direction have proven to me that certain metals, mainly iron, have the quality of absorbing all the silicon that is contained in such raw material, provided it is added in proper proportions. I have further ascertained that in the furnace (preferably the electric furnace) the resulting composition of metal and silicon separates from the other ingredients of the molten mass by settling underneath them and that they may be separately obtained by first removing such lower stratum from the fluid contents of the furnace. For an anthracite peculiarly rich in silicon the following proportions of admixtures in the furnace have been found effective, to wit: fifty-six parts, by weight, of lime; sixty parts of anthracite containing about twenty-five per cent. of silicic acid, and twenty-eight parts of metallic iron. This admixture resulted in a high-grade carbid of calcium and at the same time in a silicide of iron containing from twenty to twenty-five per cent. of silicon which permits of industrial applications.

Instead of metals which for practical purposes are employed in scrap form oxids of metals may be added to the mixture, although practically it is preferable to work with iron or oxid of iron, because this metal is more easily obtainable and especially useful for industrial purposes when compounded with its silicides.

What I claim is—

1. The process of simultaneously producing carbid of calcium and a compound containing silicon, which consists in producing calcium carbid by heat sufficient to cause fusion, from raw material containing carbon calcium and silicon, simultaneously acting upon the same with an added substance containing a metal having a greater affinity for silicon than calcium has for silicon and finally removing the silicon compound and the carbid of calcium from the fused mass separately.

2. The herein-described process of simultaneously producing calcium carbid and silicide of iron, which consists in admixing lime, anthracite containing a large percentage of silicon, and iron, and subjecting the same to heat sufficient to cause fusion to simultaneously produce silicide of iron and calcium carbid free from silicon.

3. The herein-described process of simultaneously producing calcium carbid and silicide of a metal, which consists in forming an admixture of a material containing calcium, carbonaceous material capable of forming calcium carbid in reaction with such material, and a substance containing a metal having a greater affinity for silicon than calcium has for silicon, the said mixture containing silicon as an impurity, and subjecting the mixture to heat sufficient to cause fusion to simultaneously produce silicide of the added metal and calcium carbid free from silicon.

WALTHER RATHENAU.

Witnesses:
WOLDEMAR HAUPT,
HENRY HASPER.